(No Model.)

W. TUCKER.
NUT AND BOLT LOCK.

No. 362,909.    Patented May 10, 1887.

Witnesses
H. A. Lamb.
Joseph Becker

Inventor.
William Tucker,
By his Attorney

UNITED STATES PATENT OFFICE.

WILLIAM TUCKER, OF EAST BROOKFIELD, ASSIGNOR OF ONE-HALF TO GEORGE C. PROUTY, OF CHARLTON CITY, MASSACHUSETTS.

NUT AND BOLT LOCK.

SPECIFICATION forming part of Letters Patent No. 362,909, dated May 10, 1887.

Application filed March 26, 1886. Serial No. 196,676. (No model.)

*To all whom it may concern:*

Be it known that I, WILLIAM TUCKER, a citizen of the United States, residing at East Brookfield, in the State of Massachusetts, have invented a new and useful Improvement in Nut and Bolt Locks, of which the following is a specification.

This invention relates to that family of nut and bolt locks in which the nut and bolt are of ordinary external appearance and the locking device acts upon the thread of the bolt.

The present invention consists, primarily, in a novel combination of parts formed by providing the bore of a nut, or a socket-hole into which a screw or bolt is to be screwed, with one or more frictional brake-blocks, of wood or the like, so as to provide for resisting the unscrewing of the nut or bolt and the strain involved in adequately compressing the frictional "brake-blocks," and so that the latter are hermetically inclosed while the bolt is in place, so as to be unaffected by the elements, such locking device involving no peculiarity whatever in the bolt nor injury to its thread, while I am thus enabled to provide punched or drilled nuts and socket-holes from the largest sizes in bridge-work and heavy machinery to those of very minute size with said locking device.

This invention consists, further, in a nut provided with said locking device as a new manufacture.

A sheet of drawings accompanies this specification as part thereof.

Figure 1:
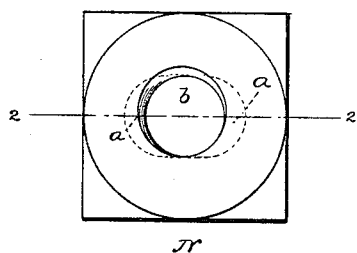
Figure 3:
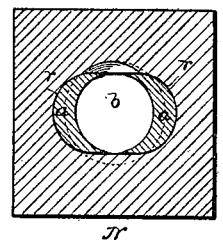
Figure 2:
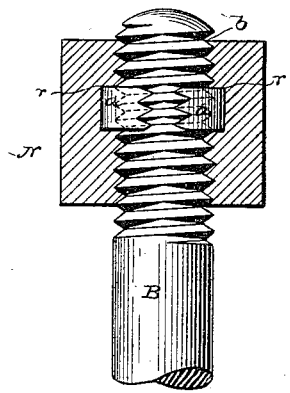
Figure 4:
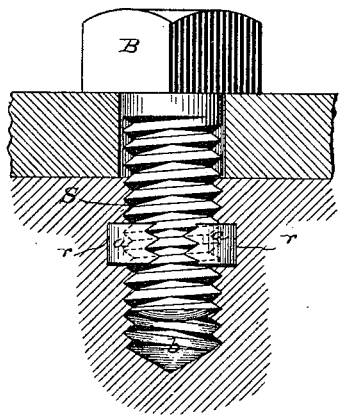

Figure 1 of the drawings represents a top view of a punched nut provided with a locking device according to this invention. Fig. 2 is an elevation of a bolt provided with said nut, the latter in section on the line 2 2, Fig. 1. Fig. 3 is a horizontal section of said nut before its application to a bolt, and Fig. 4 represents a vertical section of a bolt-socket provided with said locking device.

Like letters of reference indicate corresponding parts in the several figures.

In each embodiment of this invention the locking device comprises one or more frictional brake-blocks, *a*, which may be of hard wood, "vulcanized fiber," or any suitable resilient solid substance. These brake-blocks are fitted to and tightly fill lune-shaped recesses *r*, which extend laterally from the bore *b* of the nut N or bolt-socket S into its walls, and are closed on all other sides. The brake-blocks extend originally into the bore to the depth of the thread, or thereabout, as shown in Fig. 3, so as to be compressed and hermetically inclosed by the entering bolt B, fitted to said nut or socket, the thread of the bolt cutting or embedding itself into the inner faces of the brake-blocks. In turn the brake-blocks resist backward rotation of the nut or bolt sufficiently to render the same "locked" for all ordinary purposes without impairing the thread of the bolt or affecting the external appearance of either.

I am aware that nuts have been provided with circumferential internal recesses, and also with recesses extending through the nut from top to bottom or from bore to side, such recesses being filled with plastic or soft adhesive or elastic substances, including leather and rubber, and "with fibrous packing capable of being drawn between the threads of the nut and the bolt." The brake-blocks of my nut and bolt locks are substantially rigid, and the recesses into which they are fitted extend outward from the bore and have their greatest width at the bore, so as to be filled through the latter. Moreover, these recesses are eccentric, so as to preclude any turning of the brake-blocks with the nut or bolt without fastening the brake-blocks therein otherwise than by the bolt itself.

Having thus described my said improvement in nut and bolt locks, I claim as my invention and desire to patent under this specification—

1. The combination, with a bolt, of a counterpart having its threaded bore provided with a lune-shaped lateral recess eccentric to the axis of the bolt, and a brake-block, of wood or the like, tightly filling such recess and compressed within the same by the thread of the bolt, substantially as herein specified, for the purposes set forth.

2. A nut for screw-bolts, provided internally with lune-shaped brake-blocks, of wood or the like, which tightly fill eccentric lateral recesses in the walls of its threaded bore, having their greatest width at said bore, and originally project to the inner circumference of its thread, said brake-blocks being adapted in form and size to be inserted through said bore, and said recesses communicating only with said bore, so as to be tightly closed on all sides when the nut is applied to a bolt, substantially as herein specified.

WILLIAM TUCKER.

Witnesses:
GEORGE E. FORBES,
W. J. TUCKER.